United States Patent
Jacobsson et al.

(10) Patent No.: US 9,064,007 B1
(45) Date of Patent: Jun. 23, 2015

(54) CO-CLICK BASED SIMILARITY SCORE OF QUERIES AND KEYWORDS

(75) Inventors: Henrik Jacobsson, Zürich (CH); Diego Federici, Zürich (CH)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 12/985,220

(22) Filed: Jan. 5, 2011

(51) Int. Cl.
*G06F 17/30* (2006.01)
*G06F 7/00* (2006.01)

(52) U.S. Cl.
CPC .................................. *G06F 17/3069* (2013.01)

(58) Field of Classification Search
CPC .......... G06F 17/30648; G06F 17/3069; G06F 17/30693
USPC ......... 707/713, 728, 731, 736, 748, 749, 759, 707/765, 737, 758
See application file for complete search history.

(56) References Cited

U.S. PATENT DOCUMENTS

| | | | |
|---|---|---|---|
| 5,864,846 A * | 1/1999 | Voorhees et al. | 1/1 |
| 7,130,849 B2 * | 10/2006 | Yayoi et al. | 1/1 |
| 7,814,086 B2 * | 10/2010 | Bartz et al. | 707/708 |
| 7,912,843 B2 | 3/2011 | Murdock et al. | |
| 8,019,748 B1 * | 9/2011 | Wu et al. | 707/713 |
| 8,135,721 B2 * | 3/2012 | Joshi et al. | 707/750 |
| 2003/0050863 A1 | 3/2003 | Radwin | |
| 2008/0183685 A1 * | 7/2008 | He et al. | 707/4 |
| 2009/0063477 A1 * | 3/2009 | Adams et al. | 707/5 |
| 2010/0198760 A1 * | 8/2010 | Maddage et al. | 706/12 |
| 2010/0325129 A1 | 12/2010 | Ahuja et al. | |
| 2010/0325133 A1 * | 12/2010 | Rounthwaite et al. | 707/759 |
| 2010/0332520 A1 | 12/2010 | Lu et al. | |
| 2011/0004618 A1 | 1/2011 | Chaudhary | |

OTHER PUBLICATIONS

Author: Banks et al.: Title: Classification, Clustering and data mining applications; ISSN 1431-8814; ISBN 3-540•22014-3 Springer-verlag Barlin Heidelberg New york; Publisher: Springer verlag Barlin, Heidelberg 2004; pp. 532-534, 536-537; link: http://books.google.com/books?id=HMPbZhPM2bEC&pg=PA534&lpg=PA534&dq=unigram+vector+VS+bigram+vector&so.*
Dubin, David, "The Most Influential Paper Gerard Salton Never Wrote," Graduate School of Library and Information Science, University of Illinois at Urbana-Champaign, vol. 53, No. 4, Published Spring 2004; pp. 758-764.
Salton et al., "A Vector Space Model for Automatic Indexing," Communications of the Association for Computing Machinery (ACM), vol. 18, No. 11, Published Nov. 1975; pp. 613-620.
Office Action on U.S. Appl. No. 13/023,971 dated May 15, 2013.
Office Action on U.S. Appl. No. 13/023,971 dated Jun. 2, 2014.

* cited by examiner

*Primary Examiner* — Md. I Uddin

(74) *Attorney, Agent, or Firm* — John D. Lanza; Foley & Lardner LLP

(57) ABSTRACT

Methods, systems, and apparatus, including computer programs encoded on a computer storage medium, for determining similarities between queries. A first query and a second query are identified, and first related queries associated with the first query and second related queries associated with the second query are also identified. One or more first features for the first query are identified, and one or more second features for the second query are also identified. A first score is calculated for each first feature based on the relatedness weight associated with the respective first related query including the term of the respective first feature, and a second score is calculated for each second feature based on the relatedness weight associated with the respective second related query including the term of the respective second feature. A similarity of the first query and the second query is determined based on the first score and the second score.

26 Claims, 5 Drawing Sheets

CO-CLICK BASED SIMILARITY SCORE OF QUERIES AND KEYWORDS

BACKGROUND

The Internet provides access to a wide range of resources. For example, web pages for particular subjects are accessible over the Internet. Access to these resources presents opportunities for providing advertisements with the resources. A web page can, for example, include advertisement slots for presenting advertisements. These advertisements slots can be defined for presentation with a web page, for example, in a pop-up window. The advertisements slots can also be defined in the web page.

When a user performs a search using query terms, the query terms are used to identify relevant advertisements for the slots. The advertisements can sometimes be identified based on an exact match of the query to the keywords associated with the advertisements. Alternatively, the advertisements may be identified based on an expanded match where the query is associated with keywords and the advertisement keywords are compared against these keywords. The keywords that are associated with the query need to be ones that are related to the query in order to identify the most relevant advertisements. Many different signals can be used to identify relevant keywords to associate with queries.

BRIEF SUMMARY

The embodiments described below include systems and methods for generating keywords offline. According to an embodiment, a method may include identifying a first query and a second query. The method may also include identifying first related queries associated with the first query and second related queries associated with the second query, each of the first related queries associated with a relatedness weight indicating a strength of a relation between the first query and the respective first related query, and each of the second related queries associated with the relatedness weight indicating the weight of the relation between the second query and the respective second related query. The method may also include identifying one or more first features for the first query, each first feature including at least one term from one of the first related queries, and identifying one or more second features for the second query, each second feature including at least one term from one of the second related queries. The method may also include creating a first feature vector for the first query, the first feature vector including one or more terms from the first related queries, and for each term, including the relatedness weight associated with the respective first related query that includes the respective term, and creating a second feature vector for second query, the second feature vector including one or more terms from the second related queries, and for each term, including the relatedness weight associated with the respective second related query that includes the respective term. The method may further include determining a similarity of the first query and the second query based on the first and second feature vector.

According to another embodiment, a system may include one or more computers, and a computer-readable medium coupled to the one or more computers having instructions stored thereon which, when executed by the one or more computers, cause the one or more computers to perform operations comprising identifying a first query and a second query. The operations may also include identifying first related queries associated with the first query and second related queries associated with the second query, each of the first related queries associated with a relatedness weight indicating a strength of a relation between the first query and the respective first related query, and each of the second related queries associated with the relatedness weight indicating the weight of the relation between the second query and the respective second related query. The operations may also include identifying one or more first features for the first query, each first feature including at least one term from one of the first related queries, and identifying one or more second features for the second query, each second feature including at least one term from one of the second related queries. The operations may also include creating a first feature vector for the first query, the first feature vector including one or more terms from the first related queries, and for each term, including the relatedness weight associated with the respective first related query that includes the respective term, and creating a second feature vector for second query, the second feature vector including one or more terms from the second related queries, and for each term, including the relatedness weight associated with the respective second related query that includes the respective term. The operations may further include determining a similarity of the first query and the second query based on the first and second feature vector.

According to another embodiment, a computer storage medium encoded with a computer program is provided. The program comprising instructions that when executed by one or more processors cause the one or more processors to perform operations comprising identifying a first query and a second query. The operations may also include identifying first related queries associated with the first query and second related queries associated with the second query, each of the first related queries associated with a relatedness weight indicating a strength of a relation between the first query and the respective first related query, and each of the second related queries associated with the relatedness weight indicating the weight of the relation between the second query and the respective second related query. The operations may also include identifying one or more first features for the first query, each first feature including at least one term from one of the first related queries, and identifying one or more second features for the second query, each second feature including at least one term from one of the second related queries. The operations may also include creating a first feature vector for the first query, the first feature vector including one or more terms from the first related queries, and for each term, including the relatedness weight associated with the respective first related query that includes the respective term, and creating a second feature vector for second query, the second feature vector including one or more terms from the second related queries, and for each term, including the relatedness weight associated with the respective second related query that includes the respective term. The operations may further include determining a similarity of the first query and the second query based on the first and second feature vector.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Advertisers can bid on keywords for an advertisement. In some cases, when a user submits a search query, if the query terms match the keywords, the advertisement is identified as a responsive advertisement. Other times, the search query is expanded into keywords. The keywords are then used to identify relevant advertisements.

In order to determine which keywords are good keywords to associate with queries, the keywords can be generated offline. Queries previously submitted by users are identified. In order to determine if one query can be a keyword for the other query and vice versa, a similarity between the two needs to be determined. Related queries associated with the first and second query are identified and feature vectors are generated for each query. The similarity of the first query to the second query is determined based on a comparison of the feature vectors.

Figure 1:
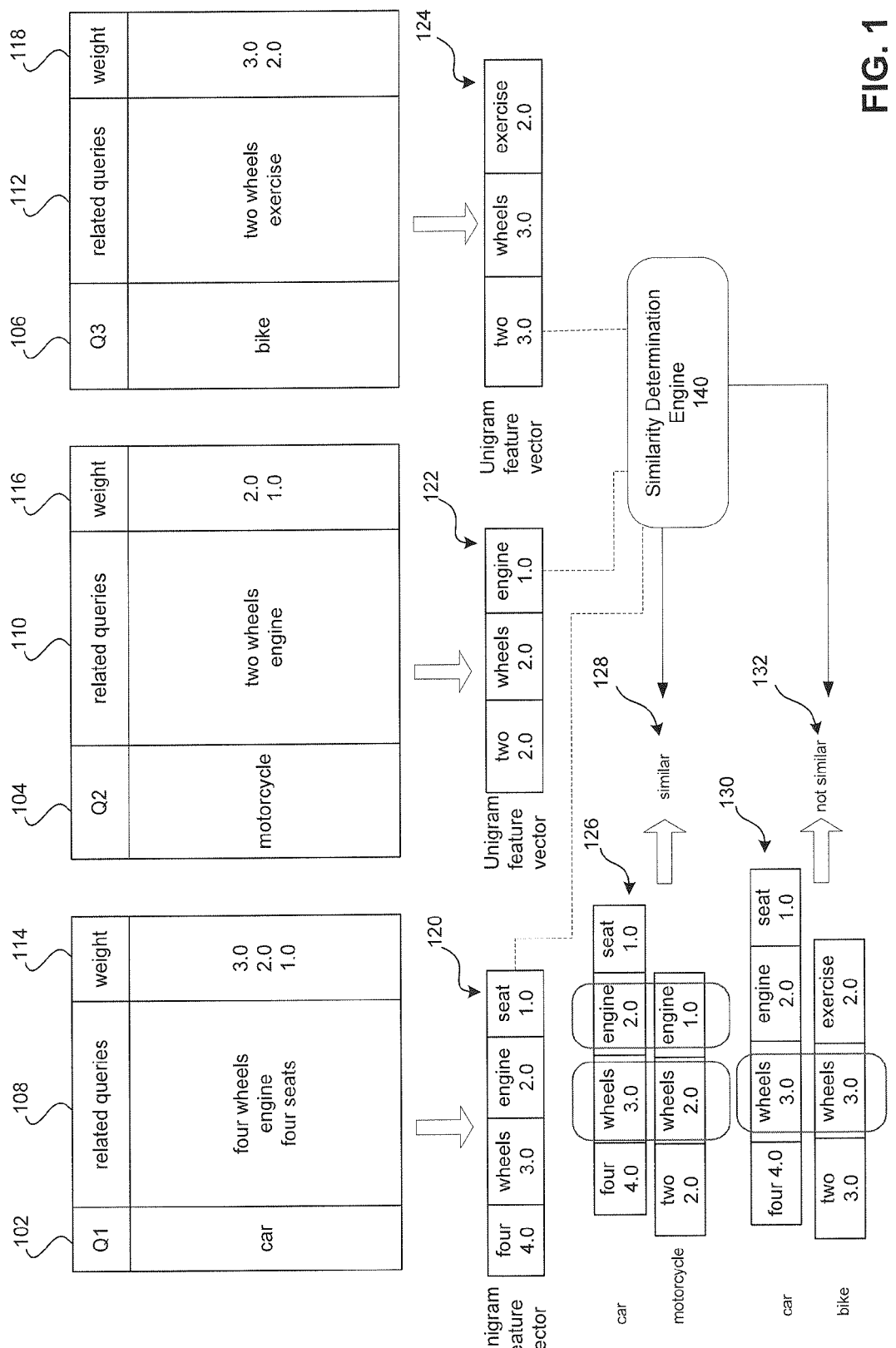
FIG. 1 is an query pair similarity example.

FIG. 1 illustrates an example of determining the similarity of queries. Queries are identified by a similarity determination engine 140. The queries can be queries that have been used in previous search requests and are stored in query logs. Once the queries are identified, related queries for each are identified. The related queries can be queries that users are likely to use instead of the original query to search for approximately the same documents. One way of identifying related queries is the co-click technique. The co-click technique is described in U.S. patent application Ser. No. 12/632,363, entitled "Using Transition Probabilities to Expand Query Keywords to Trigger Advertisements," to inventors Diego Federici and Henrik Jacobsson, filed Dec. 7, 2009, which is herein incorporated by reference. Co-click works as follows. If a search result was responsive to a first query, and the search result was selected by a user, and the same search result was responsive to a second query and the search result was also selected by the user, the second query is a related query to the first query. In other words, the average user preference for a result can be estimated based on statistical analysis of the search logs. For example, if search result A was responsive to the query "cars for sale" and was selected by a user, and the search result A was also responsive to the query "used cars" and "vintage cars," and both times the search result A was selected by the user, then "used cars" and "vintage cars" can be related queries for the query "cars for sale."

Each related query can be associated with a relatedness weight indicating a strength of a relation between the queries. The relatedness weight indicates how similar a first query is to the second query.

For example, suppose the original queries that are identified are Q1 "car" 102, Q2 "motorcycle" 104, and Q3 "bike" 106. Related queries for each original query can be identified where each related query is associated with a relatedness weight 114, 116, and 118 with respect to the original query.

In this example, the related queries 108 for the query "car" are "four wheels" with a relatedness weight of 3.0 with respect to the query "car." Another related query 108 is "engine" with a relatedness weight of 2.0 with respect to the query "car." The third related query 108 is "four seats" with a relatedness weight of 1.0 with respect to the query "car."

The related queries 110 for the query "motorcycle" are "two wheels" with a relatedness weight of 2.0 with respect to the query "motorcycle." Another related query 110 is "engine" with a relatedness weight of 1.0 with respect to the query "motorcycle."

The related queries 112 for the query "bike" are "two wheels" with a relatedness weight of 3.0 with respect to the query "bike," and "exercise" with a relatedness weight of 2.0 with respect to the query "bike."

Features can be identified for each query, the features including a term from the related queries to the first and second query. The features can then be scored, for example, by adding the transition probabilities of the term, if the term occurs in more than one query. Feature vectors can then be generated for each query. The feature vectors can include a feature, which can be a term from the related queries, as well as the relatedness weight corresponding to the related query that is associated with the term.

In some cases the feature vector can be a unigram feature vector based on the related first queries, a bigram feature vector, or a trigram based on the related first queries. In other cases, the feature vector can be the union of unigrams and bigrams. In still other cases the feature vector can also be the exact full related queries.

In this example, for the query "car," the feature vector 120 includes the terms "four" with the relatedness weight 4.0 because the term "four" was in two queries "four wheels," and "four seats," and, therefore, each relatedness weight is included in the feature vector and added. Therefore, the relatedness weight 3.0 and 1.0 are added and 4.0 is what is included in the feature vector 120. The feature vector 120 also includes the term "wheels" with the relatedness weight 3.0, the term "engine" with the relatedness weight 2.0, and the term "seat" with the relatedness weight of 1.0.

The feature vector 122 for the query "motorcycle" includes the terms "two" with the relatedness weight of 2.0, the term "wheels" with the relatedness weight 2.0, and the term "engine" with the relatedness weight 1.0.

The feature vector 124 of the query "bike" includes the term "two" with the relatedness weight 3.0, the term "wheels" with the relatedness weight 3.0, and the term "exercise" with the relatedness weight 2.0.

The feature vectors 120, 122, and 124 can then be compared to determine how similar the queries associated with each feature vector are. The feature vectors 120, 122, and 124 can then be compared, for example, based on how many features they share, using a cosine similarity function, or a Jaccard index. The cosine similarity function or Jaccard index are just examples of functions determining distance between feature vectors and other functions can be used.

For example, the feature vectors 120 and 122 can be compared as shown in comparison 126. In this comparison, the two feature vectors share the features "wheels" and "engine." The similarity determination engine 140 can set a threshold number of features that must be shared by two vectors in order for the queries associated with each vector to be considered similar. For example, if the threshold number of features is at least 2, then the queries "cars" and "motorcycle" can be identified as being similar 128.

The feature vectors 120 and 124 can be compared as shown in comparison 130. These two feature vectors only share one feature "wheels" so they can be identified as not being similar 132.

Once queries are identified as being similar, then one query can be used as a keyword for the other and potentially vice versa. For example, if query A is found to be similar to query B, then query A can be associated with query B a keyword and vice versa. Therefore, when a query is received, for example query A, because it is associated with query B as a keyword, any advertisements found responsive to query B can be identified as a responsive advertisement for query A.

In this example, the queries "car" and "motorcycle" were found to be similar 128. Therefore "car" can be a keyword associated with the query "motorcycle" and "motorcycle" can be a keyword associated with the query "car." If a user submits the query "car," because it is associated with the keyword "motorcycle," any advertisements associated with the keyword "motorcycle" can be found to be responsive to the original query "car."

Figure 2:
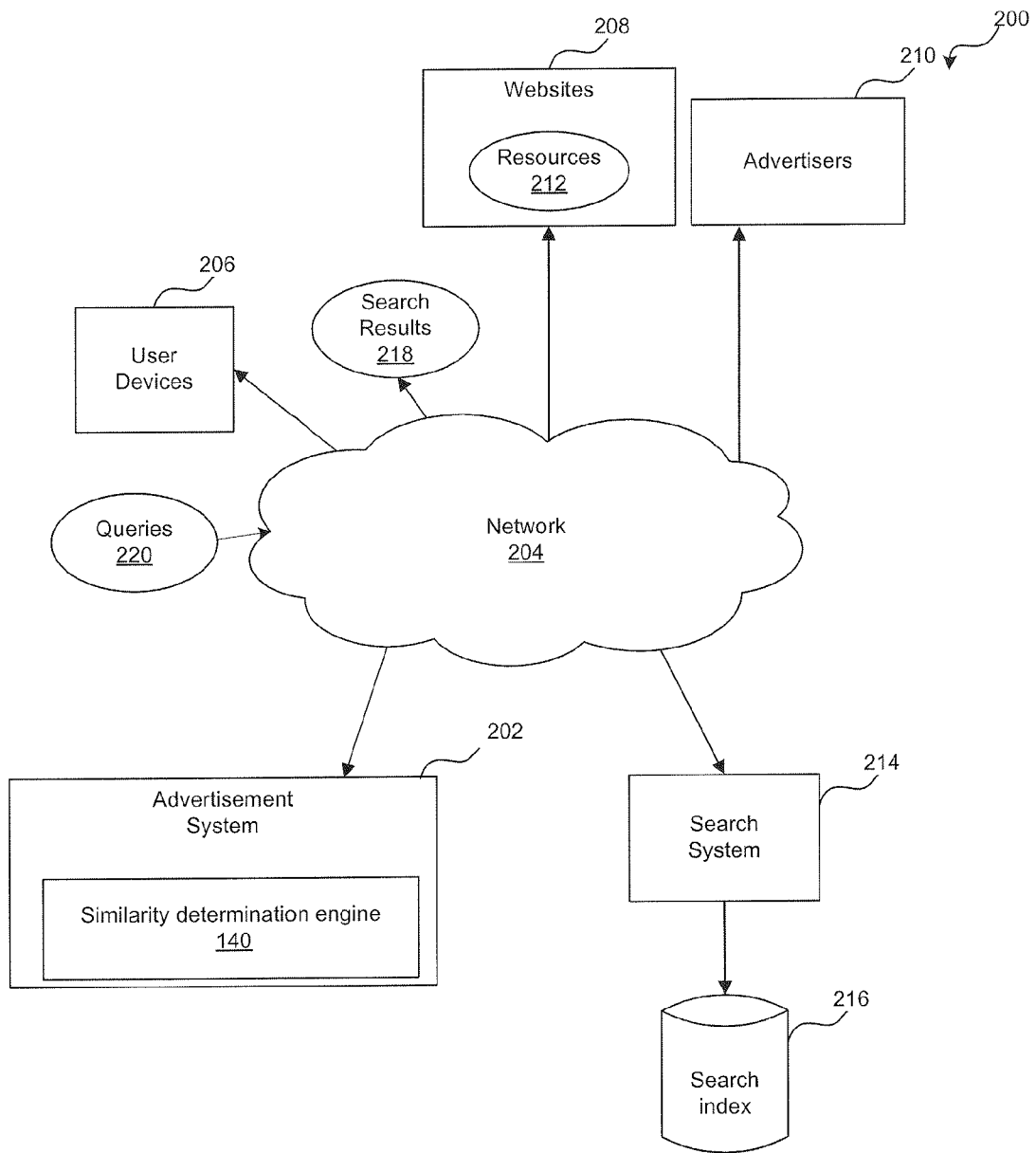
FIG. 2 is a block diagram of an example environment in which an advertisement system manages advertising services.

FIG. 2 is a block diagram of an example environment 200 in which an advertisement system 202 manages advertising services. The example environment 200 includes one or more networks 204, such as a local area network (LAN), a wide area network (WAN), the Internet, or a combination thereof. The network 204 connects user devices 206, websites 208, advertisers 210, and the advertisement system 202. The environment 200 may include many thousands of user devices 206, websites 208, and advertisers 210.

A website 208 is one or more resources 212 associated with a domain name and hosted by one or more servers. An example website is a collection of web pages formatted in hypertext markup language (HTML) that can contain text, images, multimedia content, and programming elements, such as scripts. Each website 208 is maintained by a publisher, which is an entity that controls, manages and/or owns the website 204.

A resource 212 is any data that can be provided over the network 204. A resource 212 is identified by a resource address that is associated with the resource 212. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 206 is an electronic device that is under control of a user and is capable of requesting and receiving resources over the network 204. Example user devices 206 include personal computers, mobile communication devices, and other devices that can send and receive data over the network 204. A user device 206 typically includes a user application, such as a web browser, to facilitate the sending and receiving of data over the network 204.

A user device 206 can request resources 212 from a website 208. In turn, data representing the resource 212 can be provided to the user device 206 for presentation by the user device 206. The data representing the resource 212 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment can include a search system 214 that identifies the resources by crawling and indexing the resources provided by the publishers on the websites 208. Data about the resources can be indexed based on the resource to which the data corresponds. The indexed and, optionally, cached copies of the resources are stored in an indexed cache 216.

User devices 206 can submit search queries 220 to the search system 214 over the network 204. In response, the search system 214 accesses the indexed cache 216 to identify resources that are relevant to the search query 220. The search system 214 identifies the resources in the form of search results 218 and returns the search results 218 to the user devices 206 in search results pages. A search result 218 is data generated by the search system 214 that identifies a resource that is responsive to a particular search query, and includes a link to the resource. An example search result 218 can include a web page title, a snippet of text or a portion of an image extracted from the web page, and the URL of the web page. Search results pages can also include one or more advertisement slots in which advertisements can be presented.

When a resource 212 or search results 218 are requested by a user device 206, the advertisement system 202 receives a request for advertisements to be provided with the resource 212 or search results 218. The request for advertisements can include characteristics of the advertisement slots that are defined for the requested resource or search results page, and can be provided to the advertisement system 202.

For example, a reference (e.g., URL) to the resource for which the advertisement slot is defined, a size of the advertisement slot, and/or media types that are available for presentation in the advertisement slot can be provided to the advertisement system 202. Similarly, keywords associated with a requested resource ("resource keywords") or a search query 220 for which search results are requested can also be provided to the advertisement system 202 to facilitate identification of advertisements that are relevant to the resource or search query 220.

Based on data included in the request for advertisements, the advertisement system 202 can select advertisements that are eligible to be provided in response to the request ("eligible advertisements"). For example, eligible advertisements can include advertisements having characteristics matching the characteristics of advertisement slots and that are identified as relevant to specified resource keywords or search queries 220. In some implementations, advertisements having targeting keywords that match the resource keywords or the search query 200 are selected as eligible advertisements by the advertisement system 202.

A targeting keyword can match a resource keyword or a search query 220 by having the same textual content ("text") as the resource keyword or search query 220. For example, an advertisement associated with the targeting keyword "daisy" can be an eligible advertisement for an advertisement request including the resource keyword "daisy." Similarly, the advertisement can be selected as an eligible advertisement for an advertisement request including the search query "daisy."

A targeting keyword can also match a resource keyword or a search query 220 by having text that is identified as being relevant to a targeting keyword or search query 220 despite having different text than the targeting keyword. For example, an advertisement having the targeting keyword "daisy" may also be selected as an eligible advertisement for an advertisement request including a resource keyword or search query for "flowers" because daisy is a type of flower, and therefore, is likely to be relevant to the term "flowers."

The advertisement system 202 can select the eligible advertisements that are provided for presentation in advertisement slots of a resource or search results page based on results of an auction. For example, the advertisement system 202 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement. The highest bidders can be determined based on the bids alone, or based on the bids of each bidder being multiplied by one or more factors, such as quality scores derived from advertisement performance, landing page scores, and the like.

Advertisers can also specify budgets for their advertisement campaigns. A budget is a specified amount that an advertiser is willing to pay for distribution of content over a specified budget period. The specified period can be, for example, a specified time (e.g., one day, one week, or one year), a specified number of events (e.g., a number of impressions or clicks), or some other delineation of time or events. Once the amount the advertiser is charged for distribution of content during the budget period matches or exceeds the budget amount, the campaign can be prevented from providing content for the remainder of the budget period unless the advertiser increases or overrides its specified budget.

A conversion occurs when a user performs a particular action related to an advertisement provided with a resource or search results page. What constitutes a conversion may vary from case to case and can be determined in a variety of ways. For example, a conversion may occur when a user clicks on an advertisement, is referred to a web page, and consummates a purchase there before leaving that web page. A conversion can also be defined by an advertiser to be any measurable/observable user action such as, for example, downloading a white paper, navigating to at least a given depth of a website, viewing at least a certain number of web pages, spending at least a predetermined amount of time on a website or web page, or registering on a website. Other actions that constitute a conversion can also be used.

Each advertisement provided by an advertiser 210 can be associated with a one or more keywords selected by the advertiser. The advertisement system 202 can facilitate the generation of keywords to associate with search queries offline, and use the keywords to identify relevant advertisements by identifying advertisements associated with the generated keywords. The advertisement system 202 can include a similarity determination engine 140 that can be used together or separately to identify the keywords offline. The keywords can be generated by identifying related queries and determining how similar their feature vectors are. If the feature vectors are found to be similar for two queries, then one query can be associated with the other query as a keyword and vice versa.

In embodiments, advertisement system 202 (and its similarity determination engine 140) may be implemented in software, firmware, hardware or any combination thereof on one or more computing devices. For example, advertisement system 202 and its similarity determination engine 140, may be part of or may be implemented with a computing device, such as, a processor-based computing device. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments may be software executed by a processor, firmware, hardware or any combination thereof in a computing device.

An example process of determining the similarity of queries is described with reference to FIG. 3. A swim lane diagram is described with reference to FIG. 4. A system that can be used to implement these examples is then described with reference to FIG. 5.

Figure 3:
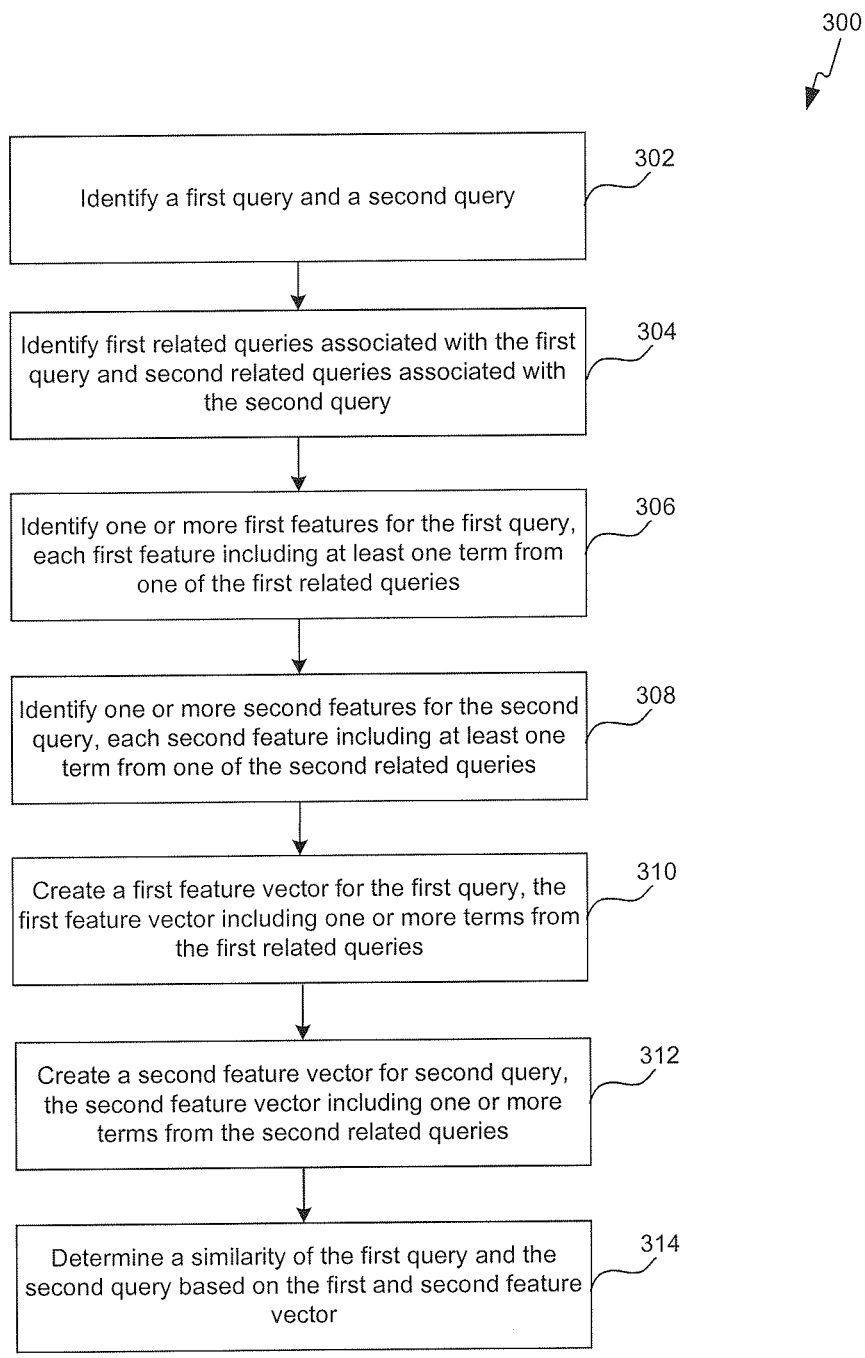
FIG. 3 is a flowchart illustrating a method for determining the similarity of queries, according to an embodiment.

FIG. 3 illustrates an exemplary method 300 for determining the similarity of queries, according to an embodiment. The process 300 can be implemented, for example, by the similarity determination engine 140 and/or the advertisement management system of FIG. 1. In some implementations, the similarity determination engine 140 is a data processing apparatus that includes one or more processors that are configured to perform actions of the process 300. In other implementations, a computer readable medium can include instructions that when executed by a computer cause the computer to perform actions of the process 300.

In step 302, a first query and a second query are identified. The queries can be identified from query logs of previous user queries.

In step 304, first related queries associated with the first query and second related queries associated with the second query are identified. The related queries can be identified using the co-click technique described above. A related query is one that a user is likely to use instead of the original (or first) query to search for similar resources.

Each of the first related queries can be associated with a relatedness weight indicating a strength of a relation between the first query and the respective first related query. The relatedness weight indicates a probability that a user starts a search using the first query and in a same user session, performs a search using the respective first related query, or a user starts a search using the second query and in the same user session, performs the search using the respective second related query. Each of the second related queries can also associated with the relatedness weight indicating the weight of the relation between the second query and the respective second related query.

In step 306, one or more first features for the first query are identified, each first feature including at least one term from one of the first related queries. Each related query comprises of one or more terms. The features identified are each one of those terms.

In step 308, one or more second features for the second query are identified, each second feature including at least one term from one of the second related queries. Again, each related query comprises of one or more terms and the features identified are each one of those terms.

In step 310, a first feature vector is created for the first query, the first feature vector including one or more terms from the first related queries, and for each term, including the relatedness weight associated with the respective first related query that includes the respective term.

In step 312 a second feature vector is created for second query, the second feature vector including one or more terms from the second related queries, and for each term, including the relatedness weight associated with the respective second related query that includes the respective term.

In step 314, a similarity of the first query and the second query is determined based on the first and second feature vector. The feature vectors can be compared to determine how many features the feature vectors share. A similarity score can be calculated based on the number of features the feature vectors share. A machine learning model can be used to try to predict whether or not the first and second query are similar using the feature vectors as well as other signals. If the machine learning model determines that they are similar, the two queries can be used as a keyword for the other and vice versa.

In some cases, the first feature vector of the first query and the second feature vector of the second query can be compared using various functions. One function is cosine similarity. In other cases, the first feature vector of the first query and the second feature vector of the second query can be compared using Jaccard index. Any such comparison function can be used in other cases.

Figure 4:
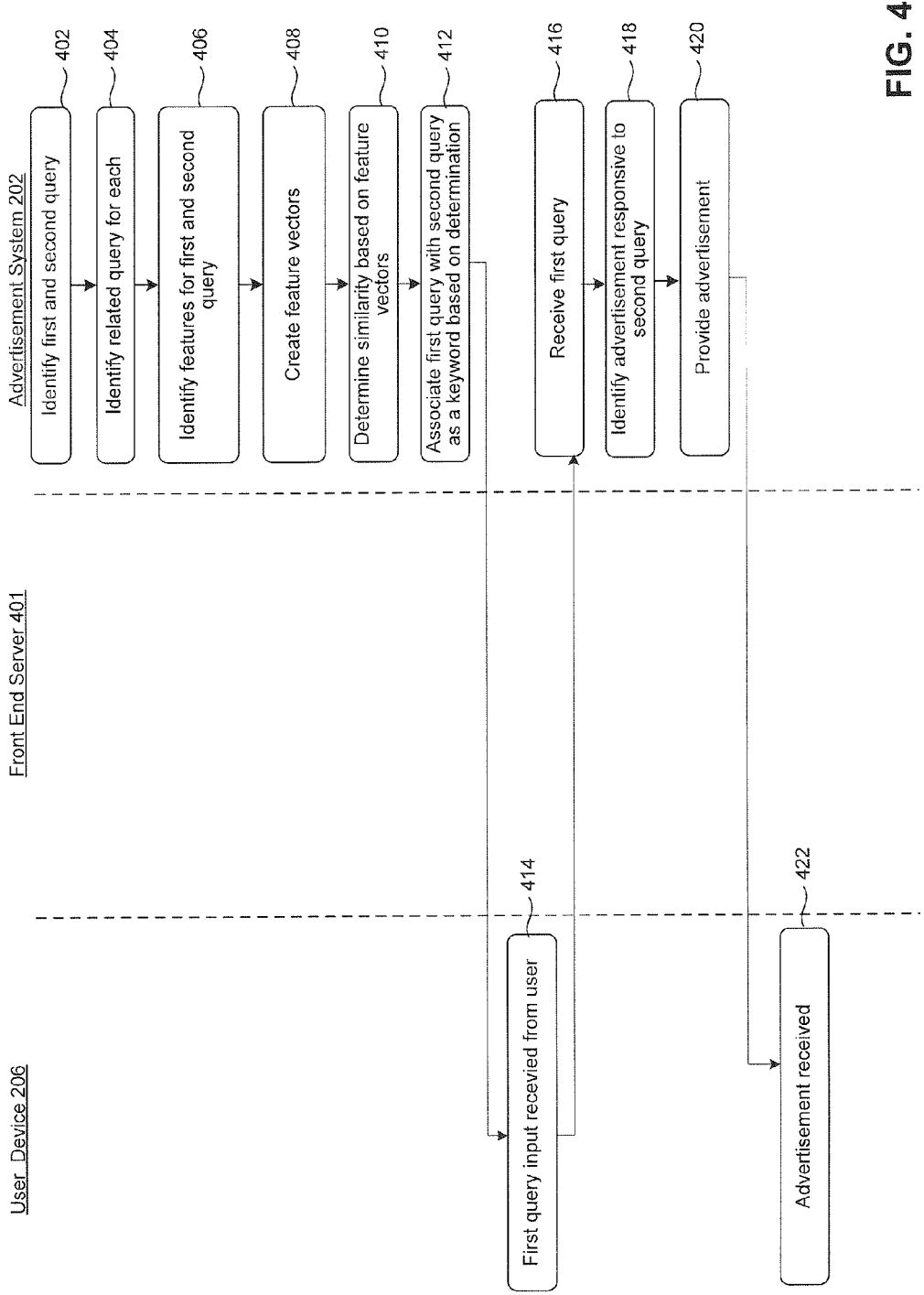
FIG. 4 is a swim lane diagram illustrating a process for determining the similarity of queries, according to an embodiment.

FIG. 4 is a swim lane diagram illustrating a process for determining the similarity of queries In this illustration, a remote server system (e.g., an advertisement system 202) identifies queries in box 402, and identifies candidate keywords for each query in box 404. In box 406, the advertisement system 202 identifies features for the first and second query. In box 408, the advertisement system 202 creates feature vectors for each query and in box 410 determines a similarity of one query to another based on a comparison of each query's feature vector. In box 412, the advertisement system 202 associates the first query with the second query as a keyword based on the determination. For example, if the feature vectors are found to be similar then the queries can be associated with each other as keywords.

In box 414, a first query input is received from the user at the user device 206. In box 416, the advertisement system 202 receives the first query. In box 418 an advertisement found responsive to the second query is identified, because the second query was associated with the first query as a keyword. In box 420 the advertisement is provided to the user device 206. In box 422, the user device receives the advertisement and provides it in response to the first query received.

Aspects of the present invention shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
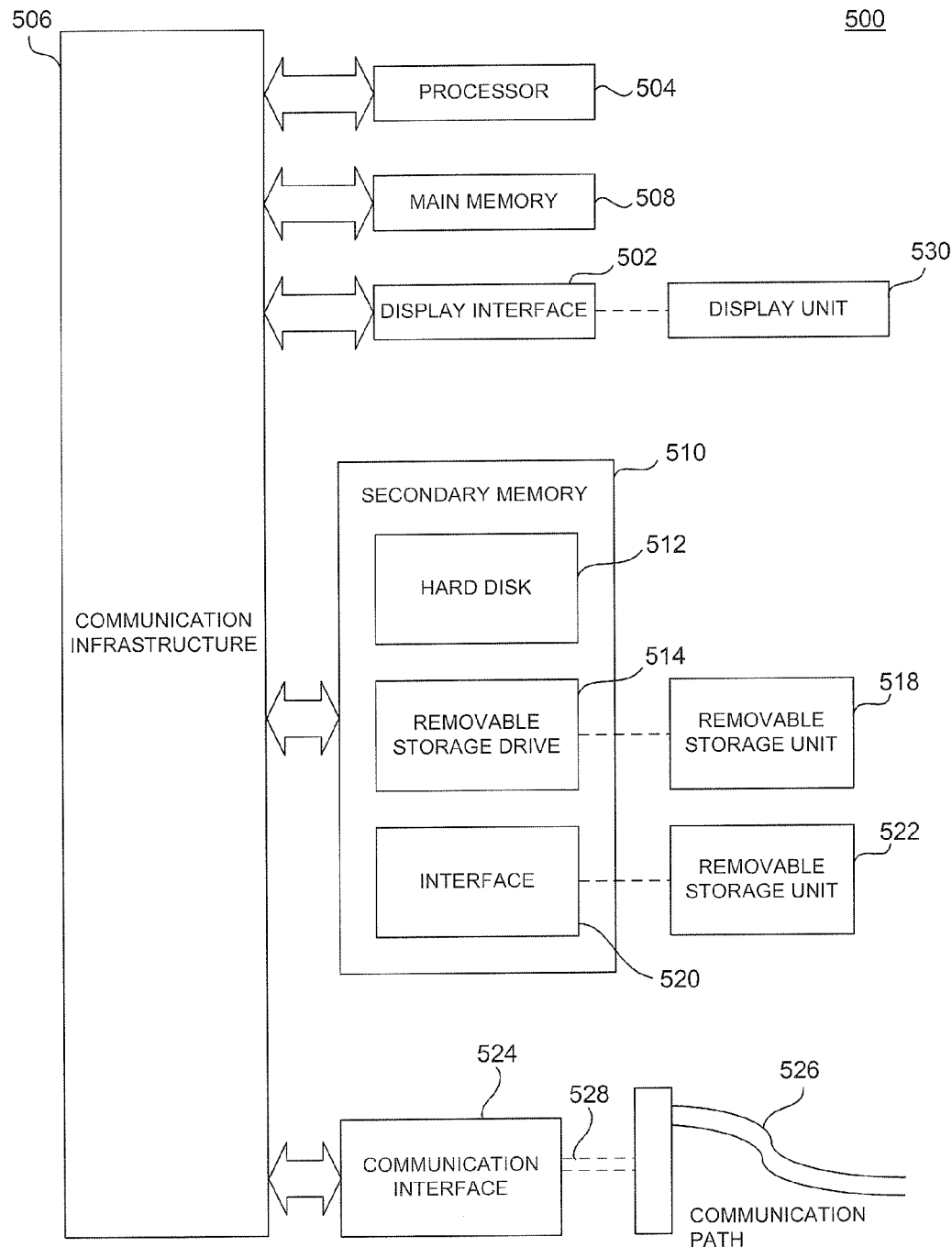
FIG. 5 is a system diagram that can be used to implement embodiments described herein.

FIG. 5 illustrates an example computer system 500 in which embodiments of the present invention, or portions thereof, may by implemented as computer-readable code. For example, advertisement system 202 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 300 of FIG. 3 discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
    identifying a first query and a second query from a same user session;
    identifying first related queries associated with the first query and second related queries associated with the second query, each of the first related queries associated with a relatedness weight indicating a strength of a relation between the first query and the respective first related query, and each of the second related queries associated with the relatedness weight indicating the weight of the relation between the second query and the respective second related query;
    identifying one or more first features for the first query, each first feature including at least one term from one of the first related queries;
    identifying one or more second features for the second query, each second feature including at least one term from one of the second related queries;
    creating a first feature vector for the first query, the first feature vector including one or more terms from the first related queries, and for each term, including the relatedness weight associated with the respective first related query that includes the respective term;
    creating a second feature vector for second query, the second feature vector including one or more terms from the second related queries, and for each term, including the relatedness weight associated with the respective second related query that includes the respective term;
    comparing the first feature vector and the second feature vector to determine a similarity of the first query and the second query;
    associating the first query with the second query as a keyword based on a determination that the similarity exceeds a threshold;
    identifying an electronic advertisement responsive to the second query based on the associating; and
    providing the electronic advertisement for display on a user device.

2. The method of claim 1, wherein a first related query is one that a user is likely to use instead of the first query to search for similar resources.

3. The method of claim 1, wherein a second related query is one that a user is likely to use instead of the first query to search for similar resources.

4. The method of claim 1, wherein the relatedness weight indicates a probability that a user starts a search using the first query and in a same user session, performs a search using the respective first related query, or a user starts a search using the second query and in the same user session, performs the search using the respective second related query.

5. The method of claim 1, wherein comparing the first feature vector and the second feature vector comprises:
    comparing the first feature vector and the second feature vector using a cosine similarity.

6. The method of claim 1, wherein comparing the first feature vector and the second feature vector comprises:
    comparing the first feature vector and the second feature vector using a Jaccard index.

7. The method of claim 1, wherein the one or more first features include at least one of the first related queries, a unigram feature based on the related first queries, or a bigram features based on the related first queries.

8. The method of claim 1, wherein creating a first feature vector for the first query comprises:
    creating a unigram feature vector for the first query based on the related first queries.

9. The method of claim 8, wherein creating a first feature vector for the first query comprises:
    creating a bigram feature vector for the first query based on the related first queries.

10. The method of claim 8, wherein creating a second feature vector for the second query comprises:
creating a unigram feature vector for the second query based on the related second queries.

11. The method of claim 8, wherein creating a second feature vector for the second query comprises:
creating a bigram feature vector for the second query based on the related second queries.

12. The method of claim 1, wherein each term in the first feature vector includes a sum of the relatedness weights associated with the respective first related queries that include the respective term; and wherein each term in the second feature vector includes a sum of the relatedness weights associated with the respective second related queries that include the respective term.

13. The method of claim 1, wherein the comparing the first feature vector and the second feature vector comprises:
comparing the first feature vector and the second feature vector to identify features shared by the first and second feature vectors; and
identifying when a number of the shared features exceeds a threshold.

14. A system comprising:
one or more computers; and
a non-transitory computer-readable medium coupled to the one or more computers having instructions stored thereon which, when executed by the one or more computers, cause the one or more computers to perform operations comprising:
identifying a first query and a second query;
identifying first related queries associated with the first query and second related queries associated with the second query, each of the first related queries associated with a relatedness weight indicating a strength of a relation between the first query and the respective first related query, and each of the second related queries associated with the relatedness weight indicating the weight of the relation between the second query and the respective second related query;
identifying one or more first features for the first query, each first feature including at least one term from one of the first related queries;
identifying one or more second features for the second query, each second feature including at least one term from one of the second related queries;
creating a first feature vector for the first query, the first feature vector including one or more terms from the first related queries, and for each term, including the relatedness weight associated with the respective first related query that includes the respective term;
creating a second feature vector for second query, the second feature vector including one or more terms from the second related queries, and for each term, including the relatedness weight associated with the respective second related query that includes the respective term;
comparing the first feature vector and the second feature vector to determine a similarity of the first query and the second query;
associating the first query with the second query as a keyword based on a determination that the similarity exceeds a threshold;
identifying an electronic advertisement responsive to the second query based on the associating; and
providing the electronic advertisement for display on a user device.

15. The system of claim 14, wherein a first related query is one that a user is likely to use instead of the first query to search for similar resources.

16. The system of claim 14, wherein a second related query is one that a user is likely to use instead of the first query to search for similar resources.

17. The system of claim 14, wherein the relatedness weight indicates a probability that a user starts a search using the first query and in a same user session, performs a search using the respective first related query, or a user starts a search using the second query and in the same user session, performs the search using the respective second related query.

18. The system of claim 14, wherein each term in the first feature vector includes a sum of the relatedness weights associated with the respective first related queries that include the respective term; and wherein each term in the second feature vector includes a sum of the relatedness weights associated with the respective second related queries that include the respective term.

19. The system of claim 14, wherein the comparing the first feature vector and the second feature comprises:
comparing the first feature vector and the second feature vector to identify features shared by the first and second feature vectors; and
identifying when a number of the shared features exceeds a threshold.

20. A non-transitory computer storage medium encoded with a computer program, the program comprising instructions that when executed by one or more processors cause the one or more processors to perform operations comprising:
identifying a first query and a second query;
identifying first related queries associated with the first query and second related queries associated with the second query, each of the first related queries associated with a relatedness weight indicating a strength of a relation between the first query and the respective first related query, and each of the second related queries associated with the relatedness weight indicating the weight of the relation between the second query and the respective second related query;
identifying one or more first features for the first query, each first feature including at least one term from one of the first related queries;
identifying one or more second features for the second query, each second feature including at least one term from one of the second related queries;
creating a first feature vector for the first query, the first feature vector including one or more terms from the first related queries, and for each term, including the relatedness weight associated with the respective first related query that includes the respective term;
creating a second feature vector for second query, the second feature vector including one or more terms from the second related queries, and for each term, including the relatedness weight associated with the respective second related query that includes the respective term; and
comparing the first feature vector and the second feature vector to determine a similarity of the first query and the second query;
associating the first query with the second query as a keyword based on a determination that the similarity exceeds a threshold;
identifying an electronic advertisement responsive to the second query based on the associating; and
providing the electronic advertisement for display on a user device.

21. The computer storage medium of claim 20, wherein a first related query is one that a user is likely to use instead of the first query to search for similar resources.

22. The computer storage medium of claim 20, wherein a second related query is one that a user is likely to use instead of the first query to search for similar resources.

23. The computer storage medium of claim 20, wherein the relatedness weight indicates a probability that a user starts a search using the first query and in a same user session, performs a search using the respective first related query, or a user starts a search using the second query and in the same user session, performs the search using the respective second related query.

24. The computer storage medium of claim 20, wherein each term in the first feature vector includes a sum of the relatedness weights associated with the respective first related queries that include the respective term; and wherein each term in the second feature vector includes a sum of the relatedness weights associated with the respective second related queries that include the respective term.

25. The non-transitory computer useable medium of claim 20, wherein the comparing the first feature vector and the second feature comprises:
   comparing the first feature vector and the second feature vector to identify features shared by the first and second feature vectors; and
   identifying when a number of the shared features exceeds a threshold.

26. The method of claim 1, wherein the electronic advertisement comprises an electronic online advertisement served over a network, and
   the identifying identifies the electronic on-line advertisement responsive to the second query based on the associating; and
   the providing provides the electronic on-line advertisement for display on a user device.

* * * * *